April 15, 1969    E. O. SCHONSTEDT    3,439,264
CORE ASSEMBLY OF PREFABRICATED PARTS FOR
A MAGNETIC FIELD SENSOR
Filed Aug. 14, 1967

INVENTOR
ERICK O. SCHONSTEDT
BY
ATTORNEY

United States Patent Office 3,439,264
Patented Apr. 15, 1969

3,439,264
CORE ASSEMBLY OF PREFABRICATED PARTS FOR A MAGNETIC FIELD SENSOR
Erick O. Schonstedt, Silver Spring, Md.
(1775 Wiehle Ave., Reston, Va. 22070)
Filed Aug. 14, 1967, Ser. No. 660,258
Int. Cl. G01r 33/02
U.S. Cl. 324—43          1 Claim

ABSTRACT OF THE DISCLOSURE

A core assembly of prefabricated parts for a magnetic field sensor of the flux-gate type having a prefabricated U-shaped, preferably non-magnetic, dual purpose electrical conductor and support through which an alternating excitation current is passed. The respective parallel legs of the support are encircled by helical prefabricated coils of permeable magnetic material. The wound support is enclosed in a tubular housing of insulating material around a central portion of which is peripherally wound a signal pickup winding.

BACKGROUND OF THE INVENTION

In my prior Patent No. 2,916,696, issued Dec. 8, 1959, I described a saturable measuring device and a magnetic core which functions in basically the same manner as that of the present invention. However, while the helical core sensor of said prior patent has, from a functional standpoint, proven to b ehighly successful, the particulai structure illustrated and described in that patent is quite expensive from a manufacturing standpoint. In other words, a considerable degree of manual skill and time-consuming effort are required in the production of that sensor.

Because of the wide variety of potential applications of the sensor disclosed in said prior patent, it has become of extreme importance to develop a structure which, while possessing the same functional advantages as the earlier sensor, can be manufactured at low cost and with a minimum of manual effort, and one, which in operation, consumes appreciably less powder than that previously disclosed.

SUMMARY OF INVENTION

The present invention is designed to minimize manufacturing costs and time consumption by utilizing prefabricated parts which are relatively inexpensive and can be assembled on a mass production basis.

It is also an object of the invention to provide a magnetic field sensor with a permeable magnetic core having a very high coupling with the magnetic field which cyclically magnetizes the core.

A further object is to provide a magnetic field sensor of very low power consumption.

The basic parts of the invention consist of a preferably stainless steel, U-shaped conducting and supporting wire which can be manufactured by automatic machinery, and helical permalloy wire coils which form the core. These coils can be wound much the same as a conventional compression spring and formed on an automatic spring winding machine. The cores are supported on the stainless steel wire which also serves as the conductor through which the excitation current is passed. The permalloy cores may be retained in place on the parallel arms of the U-shaped wire by flattening or crimping portions of the arms at desired locations.

THE DRAWINGS

Referring to the drawings in which numerals of like character designate similar parts throughout the several views.

DETAILED DESCRIPTION OF INVENTION

Figure 1:
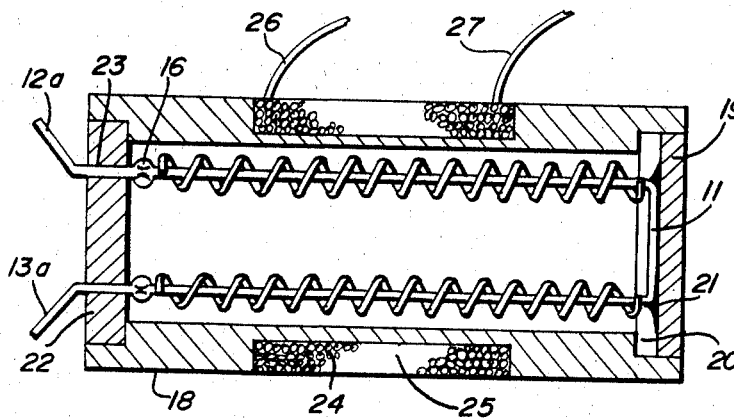
FIG. 1 is a longitudinal sectional view of the assembled sensor.
Figure 2:
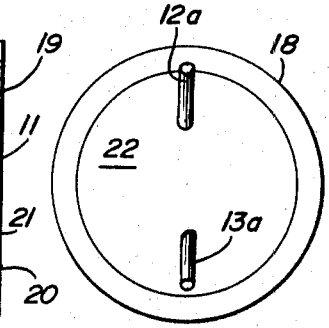
FIG. 2 is an end view of the same.
Figure 3:
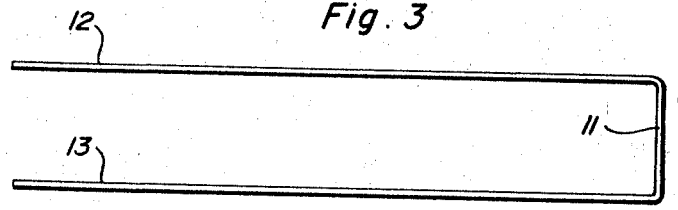
FIG. 3 is a detail of the combined electrical conductor and support element.
Figure 4:
FIG. 4 is a detail of one of the helical permalloy springs.

In the drawings, 10 represents a U-shaped, stainless steel wire which is bent sharply from its base 11 to form two parallel legs 12 and 13. As before indicated, this U-shaped wire which serves the dual purpose of an electrical conductor and support for the cores, can be prefabricated by automatic machinery. Preferably, this wire is of the 300 series which is basically non-magnetic.

Figure 5:
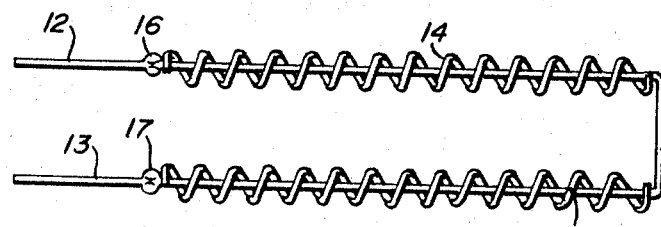
FIG. 5 is a view showing the permalloy coils in place on the conductor and support.

Prefabricated, helical coils of permalloy wire 14 and 15 are slipped on the legs 12 and 13 respectively, of the connector-support 10, with one end of each coil in abutment with the base 11 of the U-shaped wire. At the opposite ends of these coils, the legs 12 and 13 are preferably flattened or otherwise deformed as at 16 and 17, to retain the coils in place on the legs. When thus assembled, as shown in FIG. 5, the unit is hydrogen annealed to obtain the desired magnetic properties of the permalloy of the coils 14 and 15.

While the spring or coil illustrated comprises a uniform winding, there may be some advantage to having the turns of the coils more closely spaced at the ends in order that the ends may be subjected to a somewhat stronger magnetized field than would be the turns at the centers of the coils. A variable pitch coil can be readily produced on existing automatic machinery, and presents no problem.

As seen in FIG. 1, the core assembly, comprising the U-shaped wire 10 and the permalloy coils 14 and 15, is enclosed in a tube or housing 18 of insulating material, one end of which is closed by an inset disc 19, also of insulating material. The inner face of the disc 19 is provided with a transverse slot or recess 20 which receives and supports the base 11 of the conductor-support 10, preferably with the aid of a suitable epoxy 21.

The opposite end of the tube 18 is closed by an inset disc 22 of insulating material, which is provided with openings 23 to receive the ends of the legs 12 and 13 of the conductor-support 10. The projecting ends 12a and 13a of the respective legs 12 and 13 project through the disc 22 for electrical connection to a suitable source of excitation current, in much the same manner as the equivalent elements are connected in my said prior patent.

Also, as in my said prior patent, a pickup winding 24 is wound on the tube 18 in a peripheral, annular groove 25. The ends 26 and 27 of the signal pickup winding 24 may be electrically connected in the same manner as the signal pickup winding in my said prior patent.

Figure 6:
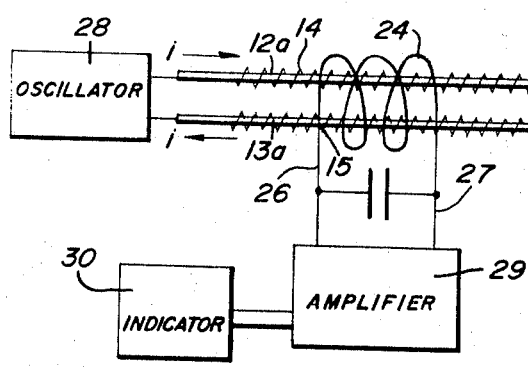
FIG. 6 is a diagrammatic illustration of an electrical circuit which may be used to demonstrate the principles of the invention.

FIG. 6 illustrates the application of the principles of the invention to a circuit for measuring variations in the earth's magnetic field. Here, it will be seen that the ends 12a and 13a of the wound conductor-support 10, forming the core, are connected to an oscillator 28. The ends 26 and 27 of the signal pickup winding 24 may be connected through an amplifier 29 to a suitable indicator 30. Thus, as in my said prior patent, the invention provides a magnetic field sensing device having a magnetic core which possesses an axis of sensitivity, in which the magnetization of the core can be achieved by an externally applied magnetic field directed parallel to said axis, and the effect of said externally applied field can be neutralized by means of a static, annularly directed field, generally centered about said axis. The magnetic core of the invention can be cyclically driven into saturation by means of an annularly directed magnetic field, and the core is resistant to becoming permanently magnetized.

As previously stated, the present invention provides a sensor which can be manufactured at low cost. However, a technical advantage is also obtained by disposing the permalloy coils 14 and 15 in close relationship to the conductor-support 10 through which the excitation current is passed. The magnetic field associated with the current that saturates the permalloy coils falls off in intensity, proportional to the relation $1/R$, where R is a radial distance from the center of the wire. It can be seen that a very efficient use of the excitation current is made by having the permalloy winding immediately adjacent the conductor. There is no significant problem for many applications of the invention in having current flow through the permalloy wire itself.

From the foregoing, it is believed that the invention may be readily understood by those skilled in the art without further description, it being borne in mind that numerous changes may be made in the details disclosed without departing from the spirit of the invention as set forth in the following claim.

I claim:
1. A core assembly for a magnetic field sensor of the flux gate type, which sensor includes a tubular housing of insulating material having a pick-up winding embracing its periphery and means for connecting the latter to detector means; said core assembly comprising a prefabricated substantially U-shaped supporting wire of substantially non-magnetic, electrical conducting material, separate prefabricated coils of permeable magnetic material independently slipped directly over and supported by the respective legs of said U-shaped supporting wire, with one end of each coil in abutment and electrical contact with the base of said U-shaped wire, said legs being peripherally deformed adjacent the opposite ends of said coils to retain the coils in place on the legs, means at one end of said housing securing said core assembly therein, and a closure at the opposite end of said housing having openings to receive the ends of the legs of said U-shaped wire for electrical connection to a source of excitation current.

References Cited

UNITED STATES PATENTS

| | | | |
|---|---|---|---|
| 2,916,696 | 12/1959 | Schonstedt | 324—43 |
| 3,127,559 | 3/1964 | Legg et al. | 324—43 |
| 3,168,696 | 2/1965 | Schonstedt | 324—43 |
| 3,319,161 | 5/1967 | Beynon | 324—47 |

OTHER REFERENCES

Other Magnetics Move In On The Standard Ferrite Core, Electronics, June 29, 1964, pp. 64–69.

RUDOLPH V. ROLINEC, *Primary Examiner.*

R. J. CORCORAN, *Assistant Examiner.*